G. STROH.
TAP.
APPLICATION FILED JUNE 18, 1910.

1,029,727.

Patented June 18, 1912.

Witnesses
G. M. Shannon.
A. M. Dow.

Inventor
GEORGE STROH
By Bartlett & Bartlett
Attorneys

UNITED STATES PATENT OFFICE.

GEORGE STROH, OF DETROIT, MICHIGAN.

TAP.

1,029,727.

Specification of Letters Patent.

Patented June 18, 1912.

Application filed June 18, 1910. Serial No. 567,552.

*To all whom it may concern:*

Be it known that I, GEORGE STROH, a citizen of the United States of America, residing at Detroit, in the county of Wayne and State of Michigan, have invented certain new and useful Improvements in Taps, of which the following is a specification, reference being had therein to the accompanying drawings.

This invention relates to taps and bushings and more particularly to that class wherein the bushing is permanently secured in a beer keg or barrel, and a tap, so called, is arranged for coupling therewith. In such devices it is desirable that the tap be so constructed that it may be readily coupled with the bushing, and a tight joint made therewith without the use of tools, as the coupling of the parts is usually effected when the barrel or keg is in a store room or cellar or other dark place and as the help available is usually unskilled. Furthermore it is of great advantage to have the tap constitute a single structure bodily removable from the bushing, and so arranged that the packing rings and like parts which form an essential feature of the device are not readily lost.

This invention relates more particularly to a construction of a tap sleeve whereby the coupling with a barrel bushing is readily effected by the use of the hand alone and whereby there are no loose tap parts which may be shaken off or otherwise displaced.

The invention consists in the matters hereinafter set forth, and more particularly pointed out in the appended claims.

Figure 1:
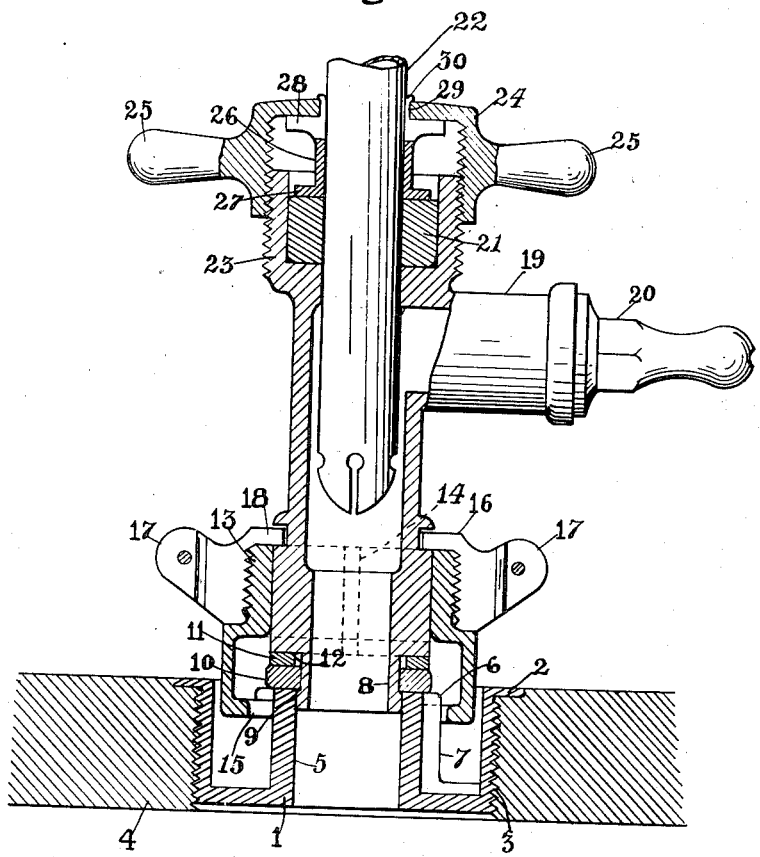
Figure 2:
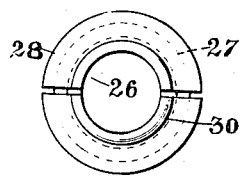

In the drawings, Figure 1 is a view in longitudinal section of a tap and bushing in operative relation; Fig. 2 is a top view of a packing-follower used in the device.

Referring to the drawings, a bushing 1 has an annular end flange 2 and exterior screw threads 3 by which it may be permanently counter sunk in a suitable aperture in the keg or barrel indicated at 4. The bushing has a central nipple 5 with an annular notched flange 6 substantially flush with the end flange 2. Longitudinal lugs or ribs 7 form stops on the annular nipple 5 at the alternate ends of the flange 6 or other convenient place.

The tap-sleeve comprises a central substantially cylindrical body terminating in a reduced neck 8 at its lower end adapted to enter the bore of the bushing nipple 5, and form a telescopic joint therewith. A bead or retaining flange 9 is formed on the end of the neck to retain a packing washer 10 which is seated against a metal washer 11 loose on the neck and rotatable against the annular shoulder 12 of the lower end of the body.

A coupling sleeve 13 is non-rotatably and longitudinally reciprocable on the lower end of the body, gains in its inner periphery engaging lugs indicated at 14 on the body. Inwardly projecting ears or lugs 15 at the lower end of the coupling sleeve are adapted to pass through the notches or gaps in the flange 6 and underrun the latter when given a part turn so as to hold the sleeve 13 against rising on the bushing. A two part clamping ring 16 with ears 17 by which it may be turned by hand is in screwthreaded engagement with the upper portion of the coupling sleeve 13, and an inner annular flange 18 on the ring 16 engages a peripheral groove in the body of the tap sleeve to prevent longitudinal movement of the clamping ring thereon. A lateral nipple 19 on the body is arranged for the reception of an air valve and nipple connection 20 preferably of the Thomas type of air valves.

The upper portion 23 of the body is slightly enlarged and counterbored for the reception of a packing-ring 21 arranged when compressed to form a close joint with a slidable tap tube 22 inserted through the body. This enlarged portion 23 is exteriorly screwthreaded to receive an annular cap 24 having radial extensions or handles 25 by which it may be readily turned by hand. A spacer sleeve or follower 26 is interposed between the cap and the packing and has its lower end provided with a marginal flange 27 seated against the washer 21. An upper flange 28 on the follower bears against the under side of the cap 24 and an extension 29 of the follower passes through the cap 24 and has a retaining bead 30 which holds it rotatably therein, the upper end of the follower being split to permit its insertion into the cap, and then being sprung outwardly to lock it in position. The tap tube 22 is introduced through the tap when the latter is in position to drive out the cork in the bushing in the usual manner.

By the above described arrangement of parts, a close joint is formed between the permanently secured bush and the removable tap sleeve by merely turning the clamping ring 16, which can readily be done by the hands without the aid of tools. Similarly a close joint is made around the tap tube by compressing the washer 21 by means of the cap 24.

When removed from the bush, the bead on the lower neck prevents the slipping off of the bush washer and possible loss, while the upper spacer-sleeve 26 is likewise retained in the cap and this also prevents loss.

Another feature is the interposition of a metal washer between the packing washer on the lower extension of the tube and the tap body, which permits the tap to be turned if desired in the bushing without wearing the washer.

Obviously, changes in the details of construction may be made without departing from the spirit of the invention and I do not limit myself to any particular form or arrangement of parts.

What I claim as my invention is:—

1. The combination with a barrel-bushing having a coupling-nipple, of a tap having a neck adapted to enter the nipple and provided with an annular retaining-bead, a metal washer loose on the neck, a packing washer loose on the neck between the washer and said bead, a coupling sleeve non-rotatable and longitudinally-movable on the tap-body and adapted to interlock with said coupling nipple, a clamping ring rotatable on the tap and in screwthreaded engagement with said sleeve.

2. The combination with a barrel-bushing having a coupling nipple, of a tap having a neck adapted to enter the nipple, a retaining bead on the lower extremity of the neck, a metal washer rotatable on the neck, a packing washer loose on the neck between the washer and said bead, a coupling sleeve non-rotatable and longitudinally reciprocable on the tap body and adapted to interlock with the nipple flange, a clamping ring rotatably secured on the tap and adapted to reciprocate the sleeve relatively thereto.

3. The combination with a barrel-bushing having a countersunk coupling-nipple, the outer end of which is substantially flush with the outer face of the bushing, an annular notched flange on the nipple, and stops on the underside of the flange between the notches, of a tap having at its lower end a neck adapted to enter the nipple, a metal washer on the neck rotatable against the lower end of the tap, a retaining bead on the lower end of the neck, a packing washer loose on the neck between the bead and washer, a coupling sleeve non-rotatable on the tap and adapted to interlock with the nipple flange, and clamping means on the tap for securing the sleeve in interlocked relation with the nipple flange and compressing said packing washer.

4. The combination with a barrel-bushing having a recess and a coupling-nipple, of a tap having a recess in its upper end and a neck on its lower end adapted to enter the nipple, a washer on the neck, a coupling sleeve on the tap adapted to interlock with the coupling nipple, a clamping ring adapted to hold the sleeve in interlocked relation with the nipple and compressing said washer, a packing-ring seated in the recess of the tap, a cap in screwthreaded engagement with the upper end of the tap body, a spacer-member between the cap and the packing ring; and having a neck on its upper end rotatable in the cap, a bead on the upper margin of the neck for retaining it in the cap, the lower end of the spacer member being adapted to bear against the adjacent washer.

In testimony whereof I affix my signature in presence of two witnesses.

GEORGE STROH.

Witnesses:
 OTTO F. BARTHEL,
 ANNA M. DORR.